US006623546B1

(12) United States Patent
Bourdel

(10) Patent No.: US 6,623,546 B1
(45) Date of Patent: Sep. 23, 2003

(54) METHOD AND INSTALLATION FOR CHEMICAL PURIFICATION OF VAPOR IN A DEHYDRATOR WITH MECHANICAL VAPOR COMPRESSION

(75) Inventor: Jacques Bourdel, Saint-Martin d'Uriage (FR)

(73) Assignee: Sirven, Lesneven (FR)

( * ) Notice: Subject to any disclaimer, the term of this patent is extended or adjusted under 35 U.S.C. 154(b) by 0 days.

(21) Appl. No.: 09/890,051

(22) PCT Filed: Jan. 25, 2000

(86) PCT No.: PCT/FR00/00153

§ 371 (c)(1),
(2), (4) Date: Jul. 25, 2001

(87) PCT Pub. No.: WO00/44475

PCT Pub. Date: Aug. 3, 2000

(30) Foreign Application Priority Data

Jan. 28, 1999 (FR) .............................................. 99 01134

(51) Int. Cl.⁷ ............................ B01D 47/12; B01D 1/22
(52) U.S. Cl. ............................ 95/199; 95/224; 96/271; 96/294; 96/322; 159/11.3; 159/49; 202/176; 202/197; 203/42; 203/72; 203/89
(58) Field of Search ........................ 95/149, 199, 224; 96/294, 270, 271, 273, 277, 280, 281, 284, 286, 287, 322; 159/11.1, 11.2, 11.3, 12, 43.1, 49; 202/176, 197; 203/40, 42, 72, 89

(56) References Cited

U.S. PATENT DOCUMENTS

| 1,992,762 A | * | 2/1935 | Pease |
| 1,999,589 A | * | 4/1935 | Frey |
| 3,798,021 A | * | 3/1974 | Bress et al. |
| 3,890,207 A | * | 6/1975 | Chapman et al. |
| 3,969,093 A | * | 7/1976 | Murray, Jr. |
| 3,985,523 A | * | 10/1976 | Kaupas et al. |
| 3,991,480 A | | 11/1976 | Menge |
| 4,926,764 A | | 5/1990 | Van den broek |
| 5,595,663 A | * | 1/1997 | Bowles et al. |
| 5,704,954 A | * | 1/1998 | Takagi |
| 5,744,009 A | * | 4/1998 | Singh et al. |
| 5,810,975 A | | 9/1998 | Bourdel |
| 5,866,046 A | * | 2/1999 | Tozawa |
| 6,451,093 B1 | * | 9/2002 | Miles |

* cited by examiner

Primary Examiner—Duane S. Smith
(74) Attorney, Agent, or Firm—McCormick, Paulding & Huber LLP

(57) ABSTRACT

According to the invention, the vapor is taken from the condensation chamber of the dehydrator and, prior to being compressed and at a temperature substantially equal to 100° C., it is caused to pass in succession through a series of purifiers, and in each of the purifiers it is forced through rain containing a purifying solution, at least one of the rain solutions being water, another containing an acid, and another containing a base. The invention is applicable to treating the vapor that results from dehydrating a variety of kinds of matter, such as farmyard manure, in particular.

16 Claims, 4 Drawing Sheets

METHOD AND INSTALLATION FOR CHEMICAL PURIFICATION OF VAPOR IN A DEHYDRATOR WITH MECHANICAL VAPOR COMPRESSION

BACKGROUND OF THE INVENTION

The present invention relates to a method and to an installation for chemically purifying vapor in a dehydrator with mechanical vapor compression.

A dehydrator with mechanical vapor compression is a dehydrator having a heat exchange wall with one face adapted to receive matter to be dehydrated, which matter is deposited on said face in the form of a thin layer.

This hot face is inside an "evaporation" chamber.

The matter deposited on the hot face is dehydrated, with the water and other volatile substances it contains evaporating into the evaporation chamber.

The vapor is taken from this chamber and it is compressed mechanically by means of a compressor, after which it is introduced into a second chamber referred to as a "condensation" chamber and containing the opposite face of the heat exchange wall.

By means of this arrangement, the quantity of heat which is given off by vapor condensing in the condensation chamber is transferred to the matter by being conducted through the heat exchange wall to the other face of the disk, where said quantity of heat serves to evaporate an equivalent volume of liquid that is to be found in the layer of matter to be dehydrated that is spread on said face.

Thus, the heat given off by condensation is recovered for evaporation, thus making it possible to work with energy input that is very low, corresponding more or less to the mechanical energy required for compressing the vapor.

This type of dehydrator is particularly well adapted to treating farmyard manure, and in particular pig manure; working pressure and temperature in the evaporation enclosure are then about 1 bar and about 100° C., while in the condensation chamber they are about 1.4 bars and about The heat exchange wall is generally a moving wall following a cyclical path, the wet matter being deposited on the hot face at the start of a cycle and the dry residue being scraped off the hot face at the end of the cycle.

In a known type of dehydrator with mechanical vapor compression as described in U.S. Pat. No. 5,810,975, the heat exchange walls are the top walls of a stack of horizontal hollow disks mounted coaxially on a vertical axis tubular shaft which is rotated continuously at uniform speed.

By way of indication, the number of disks in the stack is thirty, for example; each disk has a diameter of about 2 meters (m), and rotates at a relatively slow speed, about 0.33 revolutions per minute (rpm).

The set of disks is placed inside a vessel which constitutes the evaporation chamber; the condensation chamber is constituted by the space inside the disks and the tubular shaft, with the inside of the shaft being in communication with each of the disks.

SUMMARY OF THE INVENTION

The present invention is particularly appropriate for chemically purifying the vapor which is produced in the evaporation chamber of such a dehydrator.

It is also particularly adapted to treating farmyard manure, and in particular pig manure, where treatment must be performed at extremely low cost price and correspondingly must make use of solutions in which energy consumption is extremely small.

For a manure treatment method to be commercially acceptable, the energy required for treatment must be less than about 50 kilowatt-hours per cubic meter ($kWh/m^3$) of manure, and preferably less than 30 $kWh/m^3$.

To achieve this objective, it is necessary to ensure that the vapor condensation mechanisms in the condensation chamber (inside the disks when using a dehydrator of the type mentioned above) are not impeded by the presence of gas that is not condensable or of substances having a condensation temperature that is lower than that of water.

In various kinds of matter for dehydration, and in particular pig manure, the volatile substances that evaporate together with the water during dehydration represent a significant mass, of about 15 kilograms per cubic meter ($kg/m^3$) of manure to 25 $kg/m^3$.

This vapor contains numerous substances that are very different from one another, in particular carbon dioxide ($CO_2$) gas, ammonia ($NH_3$), various volatile fatty acids (VFAs) in the $[CH_3(CH_2)_nCCOH]$ family, ranging from acetic acid $[CH_3COOH]$ to capric acid $[CH_3(CH_2)_8COOH]$, phenols, and solvents such as alcohol, ethers, ketones, aldehydes, etc.

Some of these vapors are not condensable under the temperature and pressure conditions implemented (1 bar, 100° C); this applies to the carbon dioxide gas, the ammonia, any air, and methane and hydrogen if there has been any fermentation.

Amongst the vapors that are difficult to condense, there are the solvents, the volatile fatty acids (VFAs), and the phenols.

To obtain good operation of the dehydrator, it is necessary to begin by eliminating those undesirable vapors to as great as extent as possible, and then to ensure that the residual substances are not harmful.

Consequently, the matter to be dehydrated is subjected to prior purification.

Thus, for example, the matter to be dehydrated passes initially through a heat exchanger and degasifier device which pre-warms it to a temperature of about 85° C., for example.

Matter such as pig manure often contains ammonium carbonates which dissociate above 50° C. into carbon dioxide ($CO_2$) and ammonia ($NH_3$), such that during pre-warming in the heat exchanger, the matter loses a large fraction of its carbon dioxide together with water vapor and other unwanted gases; in contrast, nearly all the ammonia remains in solution in the matter.

Thereafter, it is advantageous to allow the matter to stand for a few hours in heated degassing and defoaming vessels, so as to bring its temperature up to about 98° C., immediately prior to applying the matter to the hot face of the dehydrator.

Thus, when it reaches the dehydrator, the matter has already lost 75% to 90% of its carbon dioxide, and the above pretreatment is particularly advantageous, economically speaking.

The object of the present invention is to use chemical purification of the vapor generated in the evaporation chamber during dehydration treatment in order to eliminate all, or nearly all, of the above-mentioned undesirable substances, in particular carbon dioxide, ammonia, VFAs, phenols, and other solvents, . . .

To this end, the method of the present invention is remarkable in that the vapor is taken from the evaporation chamber of the dehydrator and, prior to being compressed and at a temperature substantially equal to 100° C., it is caused to pass in succession through a series of purifiers, and in each of the purifiers it is forced through rain containing a purifying solution, at least one of the rain solutions being water, another containing an acid, and another containing a base.

According to other possible characteristics of the method:

the acid is a solution comprising sulfuric acid and nitric acid;

the base is a solution of lime, of potassium hydroxide, or of sodium hydroxide; and the rain is generated by means of a rotary tube pierced by a multitude of small holes, the inside of the tube containing the solution, said solution being sprayed centrifugally in the form of fine droplets to the outside of the tube.

The installation is remarkable in that it comprises a set of purifiers connected in series one after another, means for bringing the vapor to be purified to the inlet of said set, and means for feeding the treated vapor to the compressor forming part of the dehydrator, each of the purifiers being in the form of a box within which there is generated a rain of droplets of a purifying solution through which the vapor is constrained to pass, which vapor is raised to a temperature substantially equal to 100° C., and in that at least one of the rain solutions is water, at least one other contains an acid, and at least a third contains a base.

Furthermore, according to certain possible additional but non-limiting characteristics of the invention:

said set comprises at least three purifier banks, each comprising a plurality of purifiers, one of the banks treating the vapor with water, another treating it with acid, and another treating it with a base;

each of said banks is connected to a distinct vessel for recovering the solutions that have been used for treatment purposes;

the installation forms part of a dehydrator whose condensation chamber is constituted by a stack of intercommunicating horizontal hollow disks carried by a central rotary tubular shaft having a vertical axis, said stack being installed inside a vessel constituting the evaporation chamber, the matter to be dehydrated being applied in the form of a thin layer onto the top faces of the disks, and inside each disk there is received a horizontal disk-shaped partition fixed to the central shaft, with the diameter of the partition being smaller than that of the hollow disk, said partition being spaced apart from both horizontal faces of the disk and constituting a baffle for directing vapor flow;

the vapor delivered by the compressor is brought to the inside of said tubular shaft, the shaft communicating via its top end with the top disk, above its partition, such that the vapor travels downwards through the stack of disks;

the vapor carrying non-condensable gas is taken from the bottom disk of the stack;

it includes a system for recovering heat from the vapor conveying non-condensable gas;

said heat recovery system comprises a coil immersed in a trough of water disposed inside the evaporation chamber, with the vapor conveying non-condensable gas being caused to flow in the coil;

the installation includes a burner suitable for burning off the non-condensable gas at its outlet; and the installation includes means for delivering the condensation water presence in the vapor at the outlet from said coil into the trough.

BRIEF DESCRIPTION OF THE DRAWINGS

Other characteristics and advantage of the invention appear from the description and the accompanying drawings which show a preferred embodiment.

In the drawings.

DESCRIPTION OF PREFERRED EMBODIMENTS

Figure 1:
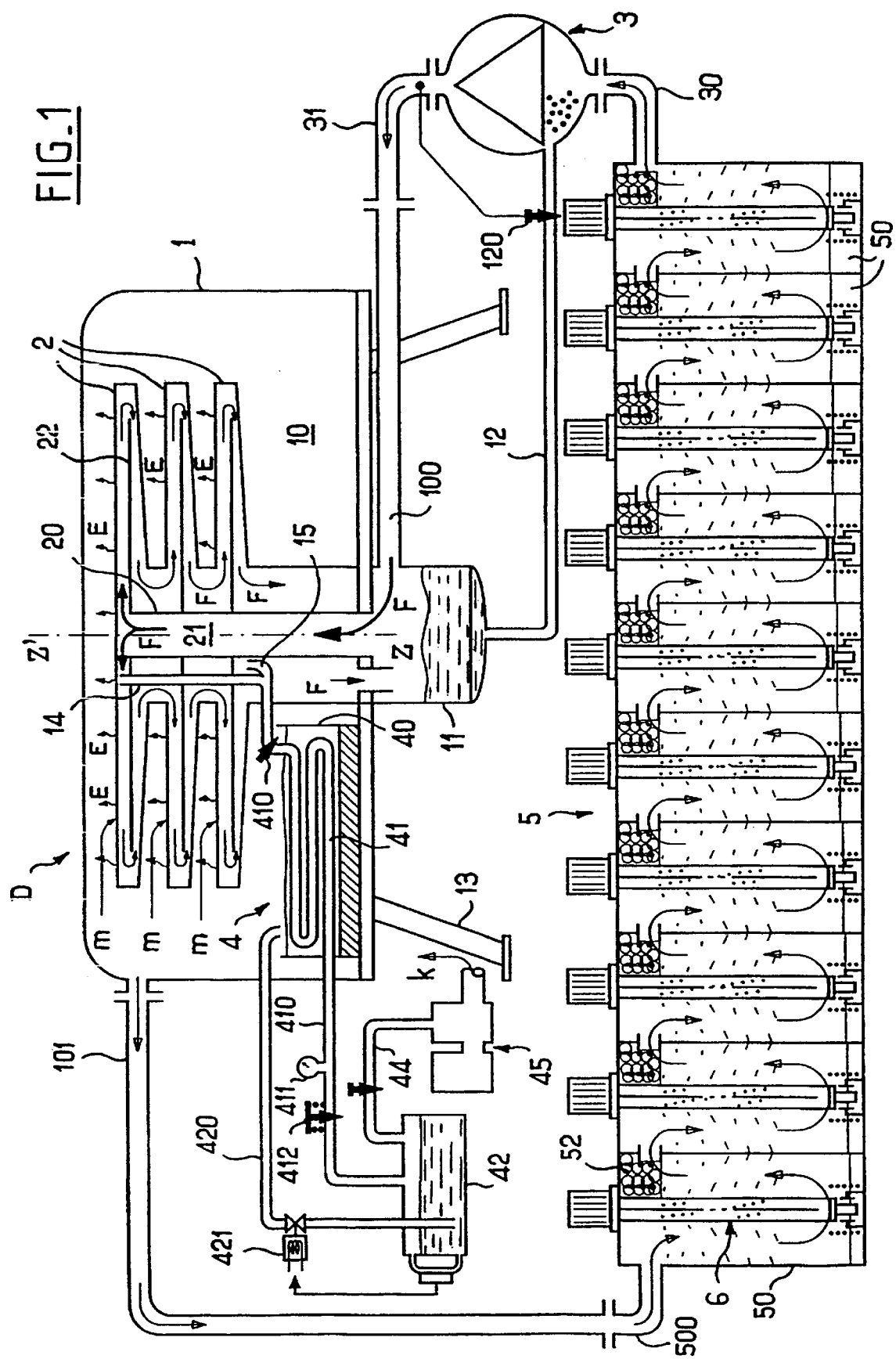
FIG. 1 is an overall diagram of an installation of the invention fitted to a hollow disk dehydrator.

In FIG. 1, reference 1 designates the vessel of a dehydrator with mechanical vapor compression, in which the inside space 10 constitutes the evaporation chamber. This chamber contains a stack of identical hollow disks 2 carried by a central tubular shaft 20 having a vertical axis ZZ'.

Each hollow disk 2 has a top face that is smooth, plane, and horizontal, onto which the matter for dehydration is applied in the form of a thin layer, with this application being symbolized by arrows m.

The figure shows only three disks so as to avoid pointless crowding. Naturally, in reality the number of disks is greater than three, for example it is equal to thirty.

The tubular shaft 20 is driven to rotate about its own vertical axis ZZ' at a uniform speed.

During one revolution, the layer of matter deposited on the disks dehydrates under the effect of heat, and so water and other volatile substances contained in the matter evaporate into the enclosure 10, as symbolized by short arrows E.

Scraper means (not shown) remove the dry solid residue that remains on the disks at the end of one revolution.

Inside each of the disks 2, there is received a horizontal disk-shaped partition 22 which is fixed via the edge of its central hole to the tube 20.

Each partition 22 is of a diameter that is slightly smaller than the diameter of the disk, and it is positioned substantially at half-height within the corresponding disk so that gaps are left between the partition and both the top and the bottom walls of the disk.

The dehydrator has a compressor 3 whose outlet 31 communicates via a duct 100 with the bottom of the tubular shaft 20. The top of the shaft communicates with the top disk 2, said communication taking place on top of the partition 22 located in said top disk.

The inside spaces of the disks are in communication with one another (and with the inside of the shaft 21), so that this space as a whole constitutes the condensation chamber into which compressed vapor is delivered.

At the bottom of the condensation chamber, there is a receptacle 11 which recovers the condensate; a duct 12 serves to return it to the compressor 3 via a motor-driven valve 120 whose function is explained below.

Inside the condensation chamber, there are two tubes 14 and 15 which communicate with a coiled tube 41 which is immersed in water contained in a trough 40 situated inside the evaporation chamber 10 and constituting a recovery heat exchanger 4 whose function is also explained below.

It should be observed that one of the tubes, referenced 14, opens out above the partition in the top disk while the other tube 15 opens out below the partition in the bottom disk.

A valve 410 is mounted between these two tubes 14, 15 and the coil 41.

It should be understood that FIG. 1 is highly diagrammatic; since the assembly comprising the tubular shaft 20 and the hollow disks 2 is rotating, connections between the assembly and the duct 100, the two tubes 14, 15, and the receptacle 11 which are fixed must naturally be arranged accordingly, with this being within the skills of the person skilled in the art.

Outside the vessel 1, the coil 1 is extended by a duct 410 which opens out into a gas and liquid phase separator.

This duct carries a pressure gauge 411 and a valve 412 for adjusting the pressure in the coil.

The water which condenses in the separator 42 is returned to the trough 40 via a return duct 420 and a solenoid valve 421 whose operation is controlled automatically as a function of the level of the water present in the separator 42.

Gas is removed from the separator 42 via a duct 44 leading to a burner 45 whose function is to pyrolyze the non-condensable gas and the various foul-smelling vapors. At the outlet from the burner, the flue gases represented by arrows k are completely odorless.

The purification installation of the invention, which is referenced 5, comprises a set of identical chemical purifiers 50 connected in series.

The vapor taken from the evaporation chamber 10 is brought to the upstream end of the purifier 5 by means of a duct 101 which is connected to an inlet tube 500 of the purifier. The outlet tube from the purifier, referenced 30, is connected to the inlet of the compressor 3.

Vapor travel inside the dehydrator and the purifier is symbolized by arrows.

Figure 2:
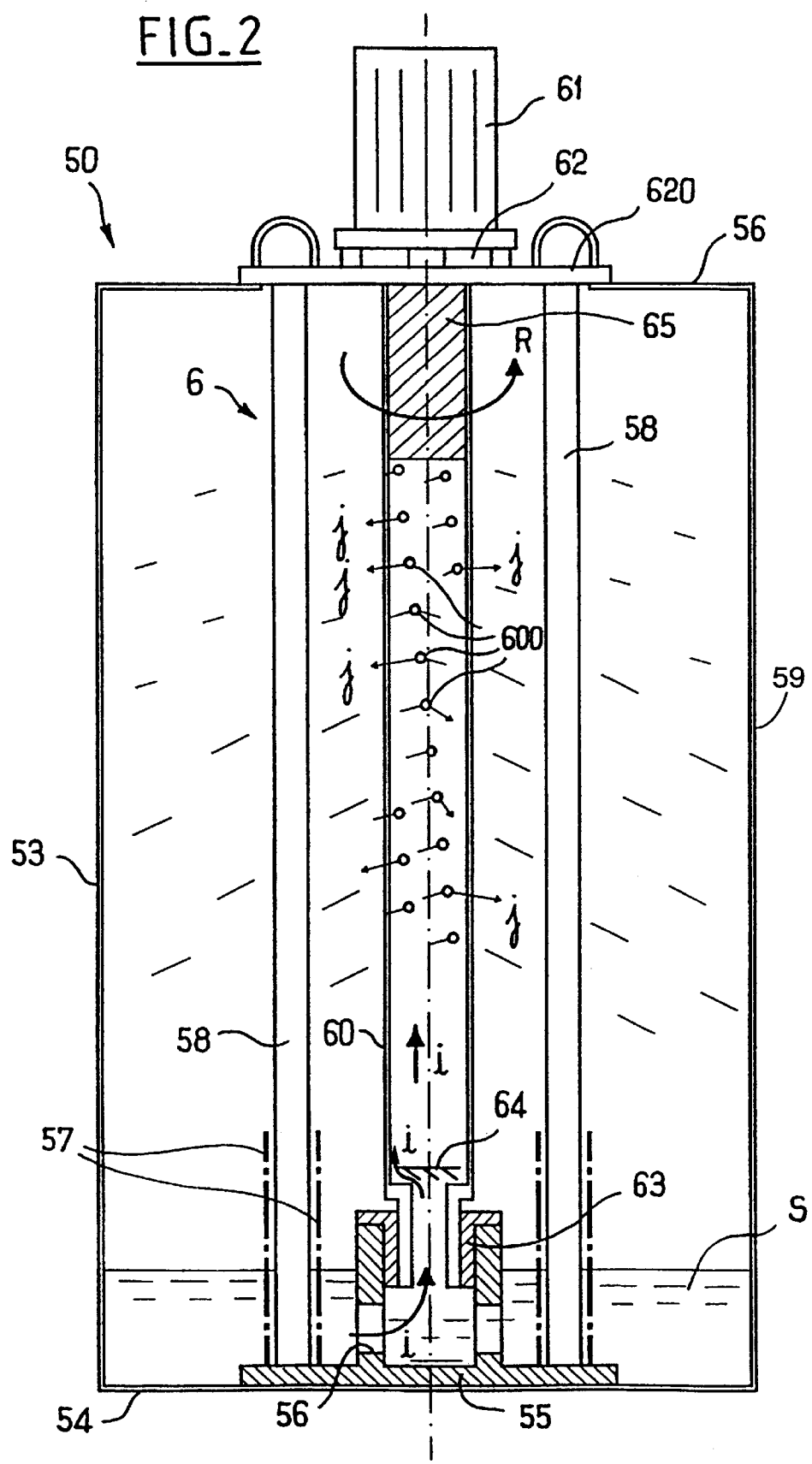
FIG. 2 is a diagrammatic axial section view of one of the purifiers making up the installation.
Figure 3:
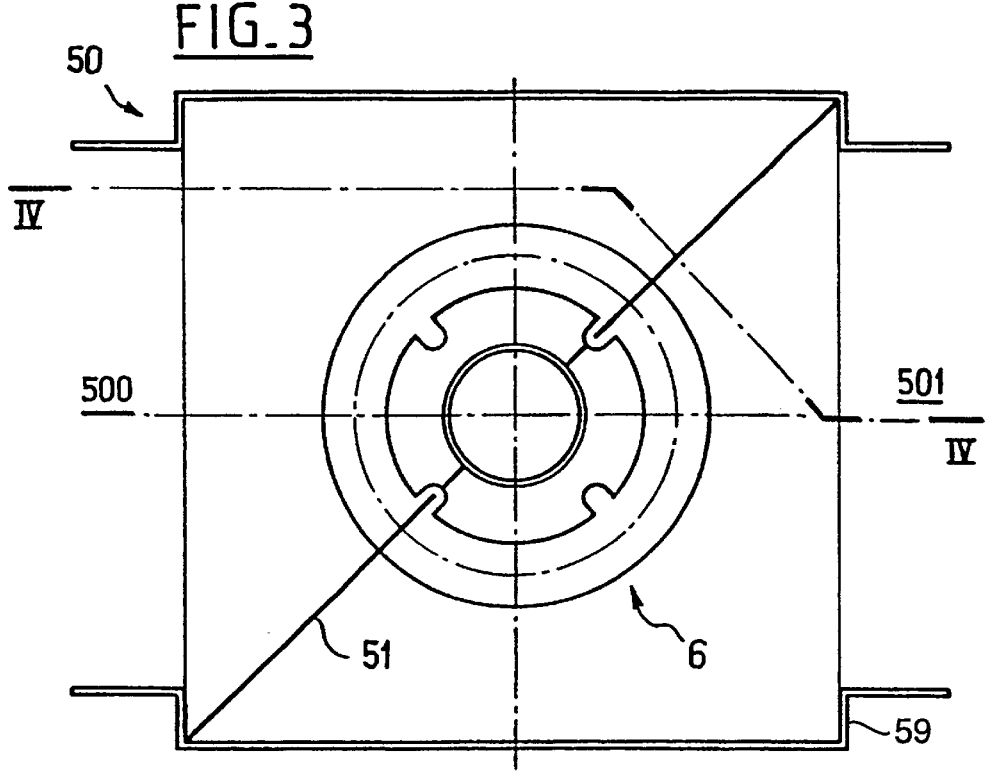
FIGS. 3 and 4 are diagrammatic views of the same purifier seen respectively from above and as a side view in section, the section plane being a staggered plane marked IV—IV in FIG. 3.

The structure of a purifier 50 is described below with reference to FIGS. 2 to 4.

The purifier is constituted by a generally rectangular box 59 of square horizontal section whose long sides define its height, since the long sides are vertical.

As an indication, each box 59 has a side of 120 centimeters (cm) and a height of 250 cm.

The sidewall of the box 59 is referenced 53 and its bottom 54.

Inside the box 59, there is mounted a system for sprinkling a chemical solution having properties suitable for purifying the vapor.

This system 6 comprises a vertical cylindrical tube 60 mounted in the center of the box. The bottom of the tube is guided in a bearing 63 carried by a fixed support 55 secured to the bottom 54. The top of the tube is guided in a bearing 62 carried by a cover plate 620 whose marginal zone rests on the margin of an opening of corresponding shape provided through the top wall 56 of the box.

The bottom support 55 and the cover plate 620 are interconnected by vertical bars 58, e.g. four bars.

The cover plate 620 carries an electric motor 61 suitable for rotating the tube 60 about its axis. The rotation of the tube 60 is symbolized by the arrow R in FIG. 2. As an indication, the diameter of the tube 60 lies in the range 80 millimeters (mm) to 200 mm, e.g. it is about 115 mm.

The cylindrical wall of the tube 60 is pierced by a multitude of small holes that are uniformly distributed over its entire length.

As an indication, several hundred small holes are provided, each having a diameter lying in the range 0.5 mm to 2 mm, e.g. being about 1 mm.

The top portion of the tube is closed by a plug 65.

Its bottom portion is open and includes a small turbine 64.

The bottom support 55 has side openings 56 which allow a liquid to pass through, specifically a purification solution that has been introduced into the box, and in which the open bottom of the tube 60 is immersed.

This solution S can consequently penetrate into the bottom opening of the tube through the holes 56 prior to being sucked up into the rotating tube by the turbine 64, as represented by arrows i.

This liquid consequently rises inside the tube and is expelled centrifugally through the holes 600 as represented by arrows j so as to form a rain of fine droplets sweeping through and occupying all of the space inside the box.

A filter 57 is located at the bottom of the sprinkler system, in the example shown, it comprises a pair of concentric cylindrical screens, about a vertical axis and placed on the support 55, on either side of the bars 58.

The function of the filter is to prevent solid particles present in the solution S penetrating into the tube 60 since that would run the risk of clogging the holes 600.

An inlet opening 500 is provided at the top of the box through one of its side faces, and a vapor outlet opening 501 is provided through its opposite face, likewise at the top of the box.

These openings are rectangular in section.

A vertical partition 51 is mounted inside the box 50 along a diagonal and on either side of the sprinkler system 6, and it is secured to two diametrically opposite edges of the box.

Figure 4:
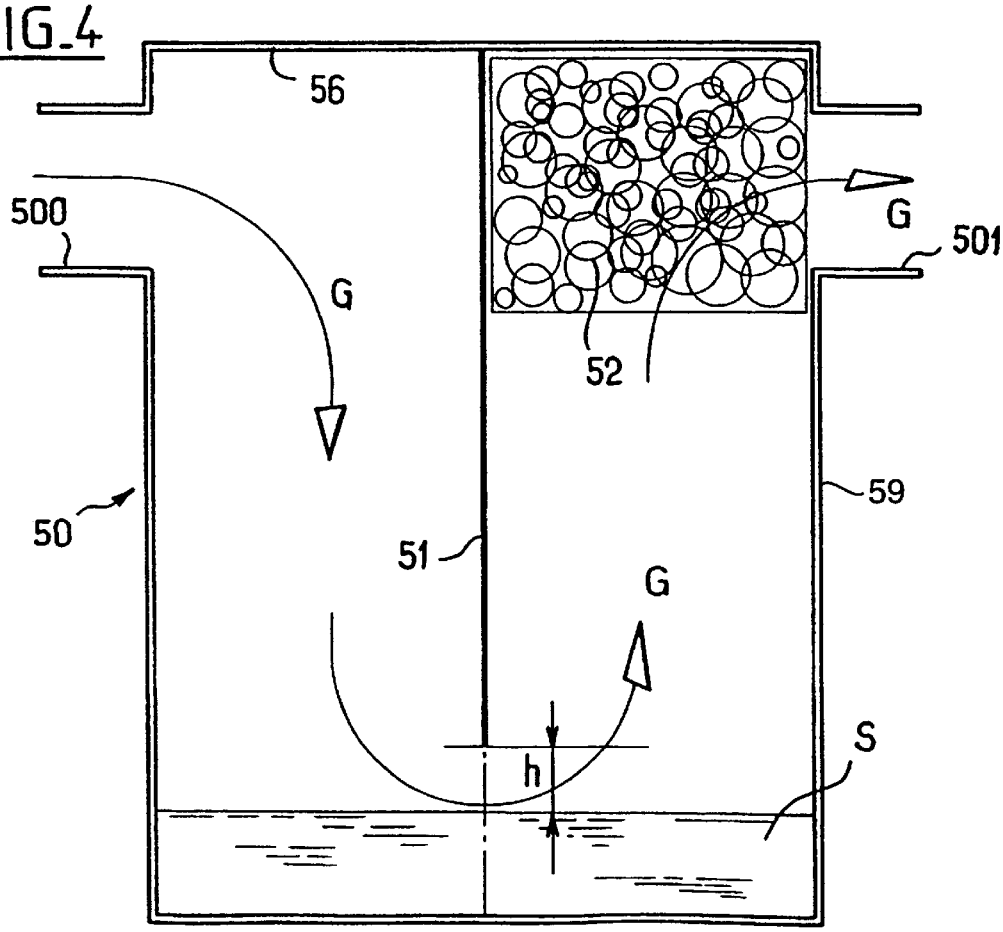

As can be seen in FIG. 4, the partition 51 is fixed at the top to the top wall 56 of the box; its height is perceptibly shorter than the height of the box so the bottom edge of the partition is at a certain distance h above the level of the solution S so as to leave a gap through which vapor can pass, with vapor flow being symbolized by arrows G.

It will be understood that by means of this disposition, the vapor which travels through the box from the opening 500 towards the opening 501 is constrained to pass beneath the partition 51 which thus acts as a baffle; consequently, the vapor is forced to pass twice through the rain that is generated by the sprinkler system 6, firstly travelling downwards and then travelling upwards.

The top space of the downstream compartment of the box (on the outlet side of the partition 51) is occupied by a device 52 called herein, by convention, a "vesicle removal". It comprises a pad made up of small clips of plastics material or stainless steel having the function of eliminating solid particles and/or relatively large droplets from the flowing vapor so that the vapor leaves the box in the form of a mist made up of droplets that are extremely fine.

The dimensions of the purifier and the area of the inlet and outlet openings are preferably determined so that the vapor travels inside the box at a speed lying in the range 0.5 meters per second (m/s) to 0.75 m/s.

The depth of the purification solution inside the box is several tens of centimeters.

The speed of rotation of the sprinkler tube 60 is selected so that the jets of solution leave it at a speed that is neither too slow nor too fast.

By way of indication, this speed is about 1400 rpm.

Cavitation problems are much less troublesome than with conventional pumps.

The purifier is very easy to maintain since the sprinkler can be extracted as a unit from the box through the opening provided in the top wall 56.

The various boxes are connected in series.

According to an important characteristic of the invention, at least one of the purifiers produces a rain of water, another produces a rain of a strong acid, and another produces a rain of a strong base.

Figure 5:
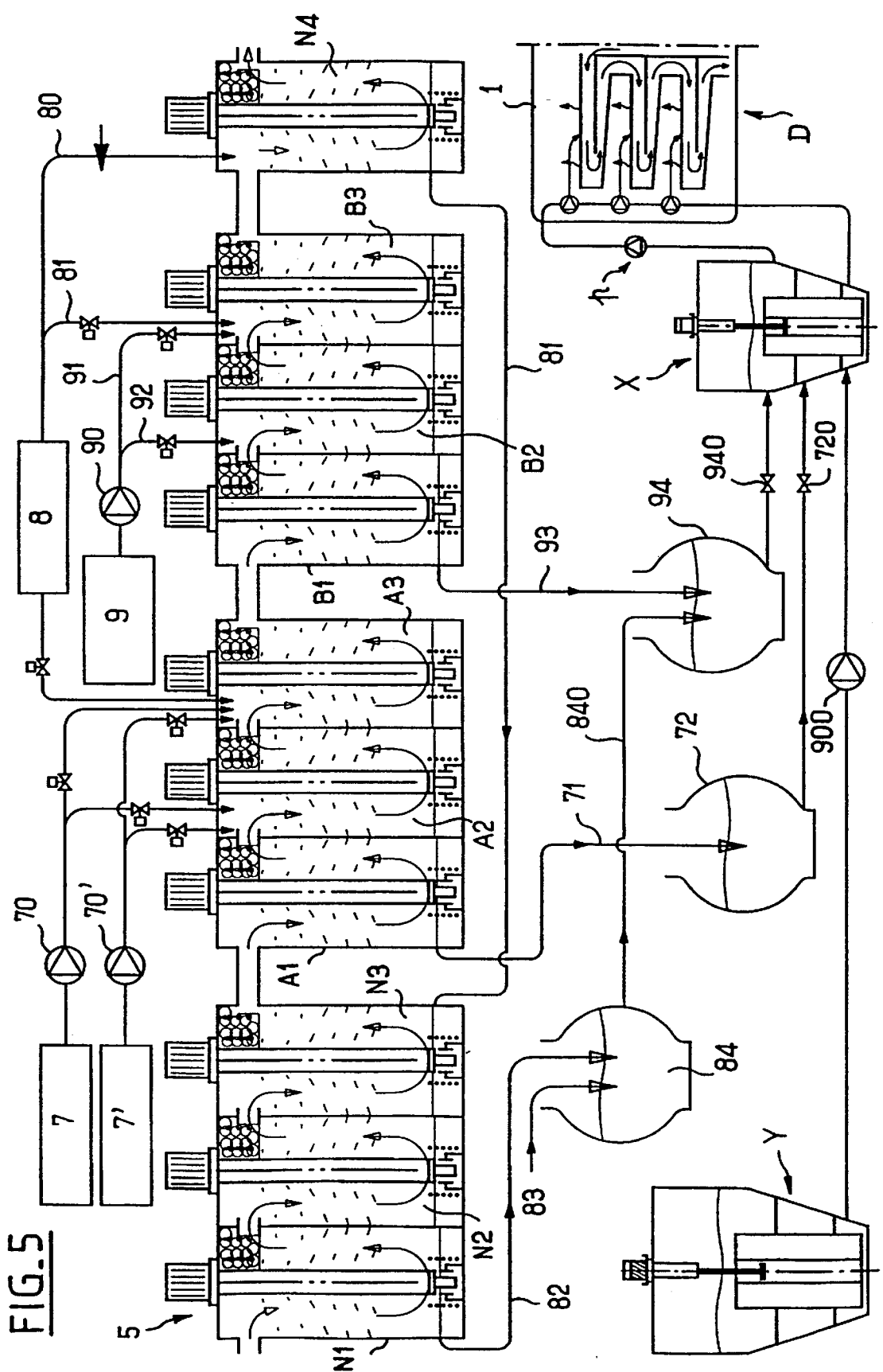
FIG. 5 is an overall diagram of the purifier.

Preferably, and as shown in FIG. 5, a bank of juxtaposed boxes is provided for each type of sprinkling.

In this figure, reference N for "neutral" designates water-sprinkling purifiers, reference A for "acid" designates acid-sprinkling purifiers, and reference B for "base" designates base-sprinkling purifiers.

Each of these letters N, A, and B is associated with a digit which corresponds to the order of the purifier in the installation, relative to the travel direction of the vapor through the installation.

Going downstream relative to the vapor travel direction, there are provided a bank of three juxtaposed water sprinklers N1, N2, N3, a bank of three juxtaposed acid sprinklers A1, A2, A3, a bank of three juxtaposed base sprinklers B1, B2, B3, and a fourth water sprinkler N4.

Within any one bank, the solution passes from one box to the next in the opposite direction to the vapor by means of an overflow system of conventional type, the level of the solution contained in the last box given index numeral 3 being higher than that in the middle box given index numeral 2, which is in turn higher than that of the first box given index numeral 1.

Suitable connections are provided for the solution in box No. 3 to flow under gravity into box No. 2, and then into box No. 1.

In addition, it is also possible for a similar flow to be established from the last box N4 to the box N3, via a duct 81.

Reference 7 designates a tank containing sulfuric acid, reference 7' a tank containing nitric acid, and reference 8 a tank containing water, while reference 9 designates a tank containing potassium hydroxide, lime, or sodium hydroxide.

Advantageously, the water is the hot distillate taken from the receptacle 11 of the dehydrator.

This water reaches purifier N4 via a duct 80; its overflow spills via duct 81 into purifier N3 and then successively into purifiers N2 and N1.

The residue after vapor treatment is evacuated via a duct 82 into a storage vessel 84.

The evacuated residue is a solution of VFAs and $NH_4$.

The acids are fed by means of pumps 70 and 70' from the respective tanks 7 and 7' into the purifiers A2 and A3 via suitable solenoid valves.

The pumps 70 and 70' are metering pumps, serving to adjust the percentages of sulfuric and nitric acid.

As an indication, the sulfuric acid percentage is about 90% to 95% and the nitric acid percentage is about 5% to 10%.

The presence of nitric acid, even at a low percentage, is useful when the components constituting the purifier (boxes, vessels, and pipework in particular) are made of stainless steel.

Nitric acid serves to "passivate" this material so as to improve its ability to withstand corrosion.

It should also be observed that hot water is injected into acid purifier A3; this serves to keep the treatment temperatures in the acid purifiers constant, and to keep A1 and A2 constantly at their selected pH values.

The vapor/solution equilibrium temperatures in the acid purifiers depend on the respective concentrations of their purification solutions.

These temperatures can be as high as 101° C. to 110° C. depending on the quantities of acid and salt present in the boxes.

At the outlet from A1, the solution is neutral, and it is stored via a duct 71 in a vessel 72.

It also contains ammonium sulfate, a small amount of ammonium nitrate, and complexes containing phenols.

This solution from the end of acid purification is treated subsequently.

The basic purifiers B receive their additives in the purifiers B2 and B3 via a pump 90 and respective ducts 91 and 92.

The purifier B3 also receives hot water from the tank 8 via a pipe 81 fitted with a solenoid valve.

The basic solution, e.g. a potassium hydroxide solution, is taken from the tank 9 and fed to B3 and B2 by means of a pump 90.

The basic purifiers are regulated in the same manner as the acid purifiers by acting on the quantities of water and potassium hydroxide injected into each of the purifiers B2 and B3 so as to keep constant the temperatures selected for treatment in these purifiers, and also keep constant the pH values selected for B1 and B2. At the outlet from B1, the solution is partially neutralized, and it is stored in a tank 94 via a duct 93.

As mentioned above, the N purifiers enable ammonia and VFAs to combine so as to form ammonium acetates.

If there is excess ammonia in the vapor to be treated, then nearly all of the VFAs are trapped in the N purifiers.

The acid purifiers A trap any residual ammonia and a large fraction of the phenols.

The basic purifiers B trap remaining carbon dioxide, any remaining VFAs, and a fraction of the phenols.

Finally, the neutral purifier N4 which contains water that is renewed only slowly, serves as a protective buffer for the compressor. Amongst other things, it traps basic fine particles coming from the purifier B3 and that have passed through its vesicle remover 52.

These fine particles are droplets of very small volume forming a mist that is not stopped by the vesicle remover, and they could impede operation of the compressor.

Inevitably, at the outlet from the last purifier N4, there nevertheless remain traces of $CO_2$, of air, of methane, and of hydrogen, together with all of the solvents (alcohols, ethers, acetone, aldehydes, etc., and several very foul-smelling compounds).

These remaining substances are eliminated by the purging provided in the dehydrator.

The assembly constituted by the dehydrator and the chemical purifier installation operates as follows:

The purified vapor is delivered by the compressor 3 into the condensation chamber 21 of the dehydrator D.

The compressor pressure must be slightly greater than atmospheric pressure so as to prevent any parasitic air entering.

The motor-driven valve 120 is controlled as a function of the temperature at the outlet of the compressor with distillation water taken from the receptacle 11 being used, where necessary, for "de-overheating", i.e. cooling, the compressor so as to ensure that its temperature does not rise excessively. This water is to be found in the form of vapor in the vapor feed circuit and it is reinjected via the duct 100 into the condensation chamber.

The vapor reaching the top disk moves progressively downwards from disk to disk following a zigzag path due to the presence of the central partitions 22, as described above. Causing the vapor to circulate in this way prevents the formation of inert pockets of non-condensable vapor or "parasitic vapor", and plays an important part in ensuring that the dehydrator operates properly.

Driven by the vapor, the non-condensable substances and parasitic vapor concentrate in the bottom disk. All of these non-condensable substances (except hydrogen which is very rare) are of molar masses that are much greater than those of water vapor, which is why they are delivered to the disks from the top.

In order to avoid the bottom disk having too great a percentage of non-condensable substances, the disks are purged by means of the tube 15; the other tube 14 in communication with the top disk constitutes a safety feature for preventing any hydrogen accumulating in the top disk.

Because of the heat recovery system 4, described above, energy is recovered from the purged substances.

By passing through the coil, the water vapor loaded with the substances for purging releases its energy by condensing, thereby causing the same quantity of water in the trough 40 to evaporate.

Thus the quantity of vapor which is lost for purging purposes is replaced by clean vapor within the chamber 10. The resulting loss of energy is no more than the energy consumed by the compressor 3 for returning the vapor to the disks from which it has been taken.

For a dehydrator with mechanical compression having a coefficient of performance (COP) of about 20, the resulting energy loss lies in the range about 0.6 kWh/m$^3$ to 3.2 kWh/m$^3$, which is quite low and entirely acceptable economically speaking.

As already mentioned above, the condensate recovered in the vessel 42 is reinjected into the trough 40, while the foul-smelling non-condensable substances are burnt off by pyrolysis using the burner 45.

As matter is dehydrated by the disks 2, the vapor produced in the evaporation chamber 10 is evacuated via the duct 101 to the purifier 5.

The hot vapor (at 100° C.) is subjected to chemical treatment in the purifier by passing through rain treatment solutions that are successively neutral, then acid, and then basic, as explained in detail above.

The storage vessel 84 placed at the outlet from the purifier N1 could be replaced by a thermal concentrator, giving rise to highly concentrated VFA-NH$_4$ solutions which could have other applications, in particular extracting carbon dioxide and concentrated ammonia.

Assuming that the VFA$_2$-NH$_4$ solutions are concentrated, then acid consumption can be reduced and it is possible almost to eliminate consumption of potassium hydroxide, which is very expensive.

For example, with animal excreta, depending on aging and on various kinds of pretreatment, it is possible to obtain vapor in which the proportions of VFA and of NH$_4$ are in equilibrium; under such circumstances, consumption of acids and of potassium hydroxide can be close to zero.

Thereafter, with these highly concentrated solutions, it is possible to envisage selectively extracting the ammonia for other value-added applications.

The vessel 84 could also be replaced by a cyclical chemical reactor into which lime is injected, as represented by arrow 83 in FIG. 5; this reactor is thus suitable for forming (VFA)$_2$Ca salts which are very stable and of low cost; at the end of the cycle, the content of the reactor 84 can be transferred into the vessel 94 as symbolized by duct 840. Under such circumstances, where the solution is reacted with lime, ammonia is returned into the circuit and there is no longer any acid saving. However, since there is excess ammonia in the vapor, VFAs are trapped by the lime, so potassium hydroxide consumption in the purifiers B becomes low.

For given valency, the cost of potassium hydroxide is fifteen times that of lime; unfortunately, the poor solubility of lime makes it difficult to use in the purifiers B.

As already mentioned, the acid and basic purification solutions are stored in respective vessels 72 and 94. By dehydrating these solutions separately, dry substances are obtained that can be stored.

However, it is not possible to mix these solutions and dehydrate them together since a large fraction of the ammonia and the VFAs trapped in them would then be released.

Once the salts are dry, they can be mixed together and then used.

Taking by way of example the treatment of pig manure in a thirty-disk dehydrator, one of the possibilities consists in dehydrating the manure with twenty-eight disks, drying the sulfate and ammonia nitrate solutions on the 29th disk, and drying the (VFA)$_2$Ca+(VFA)K+carbonate on the 30th disk.

Another possibility consists in using a mixer vessel X to mix the purification solutions with manure coming from the normal mixing and stirring vessel Y which feeds the dehydrator D with manure.

It is this mixture of manure and solutions which is delivered by means of a metering pump η to the dehydrator D, shown in part in the bottom right-hand corner of FIG. 5.

Given that it is not possible to dehydrate the acid and basic purification solutions together, it is necessary to proceed sequentially.

During a first sequence, the manure coming from the mixer-stirrer Y is mixed with the acid purification solution coming from the vessel 72 for a period of about 1 hour (total volume 1 m$^3$), and it is fed to the dehydrator D.

During the following sequence, only manure coming from the mixer Y is introduced into the dehydrator.

In a third sequence, the dehydrator is supplied with a mixture of manure and of basic purification solution taken from the vessel 94.

In a fourth sequence, the dehydrator is supplied with manure on its own.

The sequences are then repeated.

At the outlet, if the product is in the form of granules, there will be granules of manure mixed with sulfate granules, granules of manure only, or granules of manure mixed with a (VFA)Ca or K product.

Once these granules are dry, they can all be mixed together without difficulty, and they contain in a different form all of the components of the initial manure.

All of these sequences are performed by means of suitable solenoid valves 720, 940 and a pump 900.

Instead of using a separate mixer X, it is possible to use mixing tanks 72, 94; the outlet from these mixers together with the outlet from the mixer Y would then be switched sequentially to the dehydrator D.

The present invention applies not only to treating animal excreta, but also to treating a wide variety of other kinds of matter, in particular sewage sludge and waste from factories in the food industry.

What is claimed is:

1. A method for chemically purifying a vapor comprising the steps of:

providing a dehydrating system having an evaporation chamber and a condensation chamber;

evaporating within the evaporation chamber a liquid to create a vapor;

passing the vapor through a neutral rain created from a purifying solution that is generally neutral;

passing the vapor through an acid rain created from a purifying solution that is acidic;

passing the vapor through a base rain created from a purifying solution that is basic;

after the vapor has passed through the neutral rain, the acid rain and the base rain compressing the vapor; and conducting the compressed vapor into the condensation chamber.

2. The method of claim 1 wherein the purifying solution that is acidic includes sulfuric acid and nitric acid.

3. The method of claim 1 wherein the purifying solution that is basic contains a base selected from the group consisting of lime, potassium hydroxide, and sodium hydroxide.

4. The method according to claim 1, characterized by the fact that the rain in at least one of the steps of passing is generated by means of a rotary tube pierced by a multitude of small holes, the inside of the tube containing the solution, said solution being sprayed centrifugally in the form of fine droplets to the outside of the tube.

5. A dehydrator system for purifying a vapor comprising:

an evaporation chamber defined by a vessel;

heating means suitable for converting a liquid into a vapor positioned in the evaporation chamber;

three banks of purifiers connected sequentially one to the other between an entrance to the banks and an exit from the banks, the evaporation chamber being in fluid communication with the entrance to the banks, wherein each purifier bank has at least one purifier with means for converting a purifying solution into droplets in the form of rain, and at least one purifier bank uses a purifying solution that is acidic, and at least one purifying bank uses a purifying solution that is basic; and a compressor being in fluid communication with the exit from the banks and with the heating means;

whereby the vapor passes from the evaporation chamber through the at least three banks of purifiers, is compressed, and flows into the heating means.

6. The dehydrator system of claim 5 wherein each purifier bank has at least two purifiers.

7. The dehydrator system of claim 6 wherein a distinct vessel is connected to a purifier for recovering the rain therein.

8. The dehydrator of claim 5 wherein the heating means is a condensation chamber defined by a plurality of disks, each disk defining an inside space, each disk having a partition positioned within the inside space, each partition constituting a baffle, each inside space being in fluid communication one with the other such that the vapor passes in turn through the inside spaces, the disks mounted on a common tube, the inside space being in fluid communication with the compressor via the tube.

9. The dehydrator of claim 8 wherein the plurality of discs are stacked vertically one above the other creating an upper most inside space and the tube has an exit in the upper most inside space such that the vapor exiting the tube travels downward through the stack.

10. The dehydrator of claim 9 wherein the stacked discs create a bottom most inside space, and the bottom most disk defines an exit from the bottom most inside space.

11. The dehydrator of claim 5 further including a heat exchanger in fluid communication with the heating means.

12. The dehydrator of claim 11 wherein the heat exchanger is positioned within the evaporation chamber and the heat exchange includes a trough for holding a fluid and a coil, at least a portion of the coil disposed in the trough, the coil in fluid communication with the heating means.

13. The dehydrator of claim 12 further including a burner in fluid communication with the coil such that the vapor exits the coil into the burner.

14. The dehydrator of claim 12 wherein the coil is in fluid communication with the trough.

15. The dehydrator of claim 1 wherein the purifying solution in the step of passing the vapor through a neutral rain consists essentially of water.

16. The dehydrator of claim 7 wherein the at least one purifying solution that is neutral consists essentially of water.

* * * * *